US009828022B2

(12) United States Patent
Pyo

(10) Patent No.: US 9,828,022 B2
(45) Date of Patent: Nov. 28, 2017

(54) ELECTRIC POWER STEERING APPARATUS AND METHOD OF CONTROLLING THE SAME

(71) Applicant: MANDO CORPORATION, Pyeongtaek-si, Gyeonggi-do (KR)

(72) Inventor: Jong Hyun Pyo, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/003,365

(22) Filed: Jan. 21, 2016

(65) Prior Publication Data

US 2016/0214642 A1 Jul. 28, 2016

(30) Foreign Application Priority Data

Jan. 22, 2015 (KR) ......................... 10-2015-0010358

(51) Int. Cl.
*B62D 5/04* (2006.01)
*B62D 15/02* (2006.01)
*H02P 7/24* (2006.01)

(52) U.S. Cl.
CPC .................................. *B62D 5/0463* (2013.01)

(58) Field of Classification Search
CPC .................................................. B62D 5/0463
See application file for complete search history.

(56) References Cited

FOREIGN PATENT DOCUMENTS

JP 2005-225403 A 8/2005
JP 2006-131179 A 5/2006

OTHER PUBLICATIONS

Machine Translation JP 2006-131179 published May 2006.*
Korean Office Action dated Oct. 1, 2015 issued in Korean Patent Application No. 10-2015-0010358.

* cited by examiner

*Primary Examiner* — Anne M Antonucci
(74) *Attorney, Agent, or Firm* — McDermott Will & Emery LLP

(57) ABSTRACT

The present invention relates to an electric power steering apparatus and a method of controlling the same. The electric power steering apparatus includes an electric power steering apparatus including a steering motor that assists the steering force of the steering wheel; a position sensor that measures the rotational angle of the steering motor; an angle sensor that measures the rotational angle of an output end of an output shaft connected to the steering wheel; a compensation unit that calculates the difference between an angular speed of the steering motor and an angular speed of the output end of the output shaft by using the rotational angle measured by the position sensor and the rotational angle measured by the output end of the output shaft; and a steering control unit that controls a current input to the steering motor to compensate for the difference between the angular speed of the steering motor and the angular speed of the output end of the output shaft, according to the calculation result from the compensation unit. Accordingly, responsiveness and stability can be improved during a steering operation of a steering wheel by decreasing the difference between the rotational speeds of a steering motor and an output end of an output shaft that occurs due to a mechanical gap of the steering motor.

17 Claims, 9 Drawing Sheets

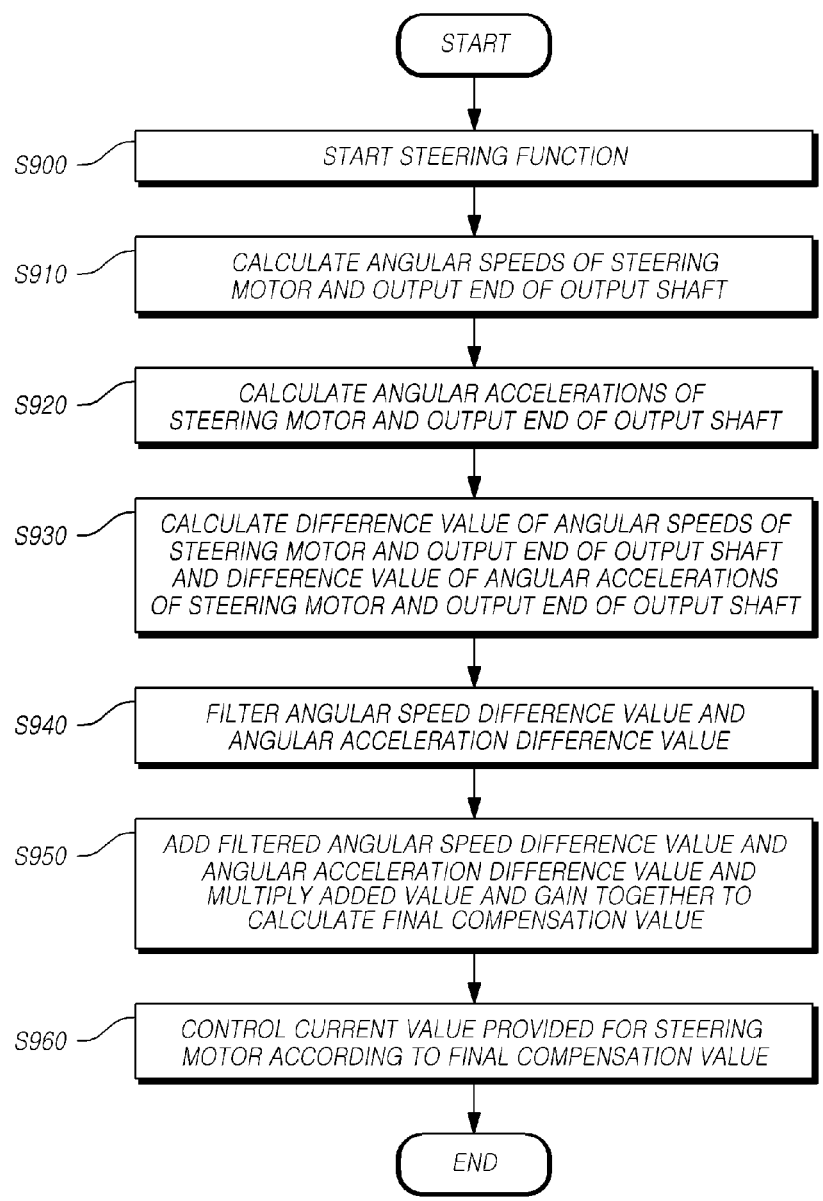

ly set forth# ELECTRIC POWER STEERING APPARATUS AND METHOD OF CONTROLLING THE SAME

CROSS-REFERENCE TO RELATED APPLICATION

This application claims priority from and the benefit under 35 U.S.C. §119(a) of Korean Patent Application No. 10-2015-0010358, filed on Jan. 22, 2015, which is hereby incorporated by reference for all purposes as if fully set forth herein.

BACKGROUND OF THE INVENTION

1. Field of the Invention

The present invention relates to an electric power steering apparatus and a method of controlling the same, and more particularly, to an electric power steering apparatus that can improve responsiveness and stability during a steering operation by compensating for a difference between the rotational speeds of a steering motor and an output side of a steering wheel that occurs due to a gap between the steering motor and the components, and a method of controlling the same.

2. Description of the Prior Art

In general, a vehicle is equipped with an electric power steering (EPS) system so that a steering wheel can be easily steered, and the electric steering apparatus assists the steering force of the driver by using a rotational force of a motor.

The electric power steering apparatus provides a steering performance for: providing an optimum steering feeling for the user by, for example, assisting the steering torque of the driver by allowing an electronic control unit to drive a motor according to a driving condition of the vehicle that is detected by a vehicle speed sensor, a torque sensor, and the like; providing a light and comfortable steering state during a low speed driving condition and providing a heavy and stable steering state during a high speed driving condition; and allowing the driver to rapidly operate the steering wheel in an abrupt emergency situation.

The electric power steering apparatuses are largely classified into a rack driven type (R-EPS) and a steering wheel driven type (C-EPS) according to whether a motor drives a rack, a steering shaft, or a steering wheel.

FIG. 1 is a schematic view of a steering shaft driven electric power steering apparatus according to the related art.

The steering shaft driven electric power steering apparatus includes a steering system 100 extending from a steering wheel 101 to opposite wheels 108, and an auxiliary power mechanism 120 that provides auxiliary steering power for the steering system 100.

The steering system 100 includes a steering shaft including an input shaft connected to the steering shaft 101 to be rotated together with the steering wheel 101, and an output shaft 102 connected to a pinion shaft 104 via a pair of universal joints 103. A torsion bar is arranged between the input shaft and the output shaft of the steering shaft, and a torque sensor 125 detects the torsion of the torsion bar in order to measure the steering force.

Further, the pinon shaft 104 is connected to a rack bar through a rack/pinion mechanism 105, and opposite ends of the rack bar are connected to a wheel 108 of the vehicle through a tie rod 106 and a knuckle arm 107. In the rack/pinion mechanism 105, because a pinion gear 111 formed in a pinion shaft 104 and a rack gear 112 formed on one side of an outer peripheral surface of the rack bar are engaged with each other, a torque is generated in the steering system 100 and the wheel 108 is steered by the torque through the rack/pinion mechanism 105 and the tie rod 106 if the driver manipulates the steering wheel 101.

The auxiliary power mechanism 120 includes a torque sensor 125 that detects a torque that is applied to the steering wheel 101 by the driver and outputs an electrical signal that is proportional to the detected torque, an electronic control unit (ECU) 123 that generates a control signal based on an electrical signal delivered from the torque sensor 125, a steering motor 130 that generates auxiliary power based on a signal delivered from the electronic control unit 123, and a reducer 140 that transmits the auxiliary power generated by the steering motor 130 to the output shaft 102 of the steering shaft.

In the steering shaft driven electric power steering apparatus according to the related art, because a damping coupler, a worm, a worm wheel, and the like are used for the configuration of the reducer 140 of the auxiliary power mechanism 120, a gap may be generated between the motor shaft and the output shaft 102, and accordingly, a rotational speed difference may occur between the steering motor 130 and the output shaft 102.

FIG. 2 is a schematic diagram of a rack driven electric power steering apparatus according to the related art.

The rack driven electric power steering apparatus includes an electronic control unit (ECU) that determines the steering degree of a steering wheel 213 according to a torque detected by a torque sensor 211 that is mounted on a steering shaft including an output shaft 210, a driving unit 220 that is controlled by the electronic control unit to generate power, a rack bar 230 that moves a tie rod 233 connected to a wheel 231 according to the steering degree of the steering wheel 213, and a driven unit 240 that receives a rotational force of the driving unit 220 to convert the received rotational force into an axial movement force and transmits the converted force to the rack bar 230.

Here, the driving unit 220 includes a steering motor 250 controlled by the electronic control unit ECU, a driving pulley 255 fixed to a shaft of the steering motor 250, and a driving belt 260 wound on the driving pulley 255.

Further, in the driven unit 240, a ball nut (not illustrated) that supports the rack bar 230 is provided in the interior of a rack housing 270 surrounding the rack bar 230, and a driven pulley (not illustrated) is assembled on an outer peripheral surface of the ball nut.

The driving pulley that is connected to the shaft of the steering motor 250 and the driven pulley that is coupled to the ball nut are arranged to be parallel to each other, the driving belt 260 is mounted on the driving pulley 255 and the driven pulley so that the rotational force of the steering motor 250 is transmitted to the rack bar 230, and the rotation of the motor is converted to a linear motion of the rack bar by an operation of the ball nut, whereby the rack bar 230 is moved leftwards and rightwards to generate an auxiliary steering force.

In the rack driven electric power steering apparatus, because the driving pulley 255, the driving belt 260, the driven pulley, the ball nut, and the like are mounted to transmit the driving force from the steering motor 250 to the rack bar 230, a gap is generated between the steering motor 250 and the rack bar 230, and accordingly, the rotational speed of the steering motor 250 and a lower portion of the output shaft 210 of the steering shaft connected to the rack bar 230 have a difference in rotational speed.

In this way, in the electric power steering apparatus according to the related art, because a difference occurs between the rotational speed of the motor and the rotational speed of the pinion shaft connected to the output shaft due to a gap between the steering motor 130 and the output shaft 102 of the steering shaft or between the steering motor 250 and the rack bar 230, the responsiveness and stability of the steering apparatus lowers.

Of course, in the electric power steering apparatus, due to the reducer for reducing the rotational speed of the motor and transmitting the reduced rotational speed to the output shaft, a difference occurs between the rotational speed of the motor and the rotational speed of the output shaft by the reduction ratio of the reducer.

Therefore, in the specification, the difference between the rotational speed of the motor and the rotational speed of the output shaft means a difference between the rotational speeds after the reduction ratio of the reducer is reflected.

SUMMARY OF THE INVENTION

The present invention has been made in an effort to solve the above-mentioned problems, and provides an electric power steering apparatus that can improve responsiveness and stability during a steering operation by compensating for the difference between the rotational speeds of a steering motor and an output end of an output shaft that occurs due to a gap between the steering motor and components.

In order to achieve the object, there is provided an electric power steering apparatus including an electric power steering apparatus including a steering motor that assists the steering force of a steering wheel, a position sensor that measures the rotational angle of the steering motor, an angle sensor that measures the rotational angle of an output end of an output shaft connected to the steering wheel, a compensation unit that calculates the difference between an angular speed of the steering motor and an angular speed of the output end of the output shaft by using the rotational angle measured by the position sensor and the rotational angle measured by the output end of the output shaft, and a steering control unit that controls a current input to the steering motor to compensate for the difference between the angular speed of the steering motor and the angular speed of the output end of the output shaft, according to the calculation result from the compensation unit.

According to another aspect of the present invention, there is provided a method of controlling an electric power steering apparatus, the method including: measuring a rotational angle of a steering motor that assists the steering force of a steering wheel; measuring a rotational angle of an output end of an output shaft that is connected to the steering wheel to be rotated; calculating the difference between an angular speed of the steering motor and an angular speed of the output end of the output shaft by using the rotational angle measured by the position sensor and the rotational angle measured by the output end of the output shaft, and controlling a current input to the steering motor to compensate for the rotation difference between the steering motor and the angular speed of the output end of the output shaft.

According to the present invention, responsiveness and stability can be improved during a steering operation of a steering wheel by decreasing a difference between the rotational speeds of a steering motor and an output end of an output shaft that occurs due to a mechanical gap of the steering motor.

BRIEF DESCRIPTION OF THE DRAWINGS

The above and other objects, features, and advantages of the present invention will be more apparent from the following detailed description taken in conjunction with the accompanying drawings, in which:

FIG. 9 is a flowchart illustrating a process of compensating for the difference between the rotational speeds of the steering motor and the output shaft output end generated by a mechanical gap in the electric power steering apparatus according to the present invention.

DETAILED DESCRIPTION OF THE EXEMPLARY EMBODIMENTS

Figure 1:
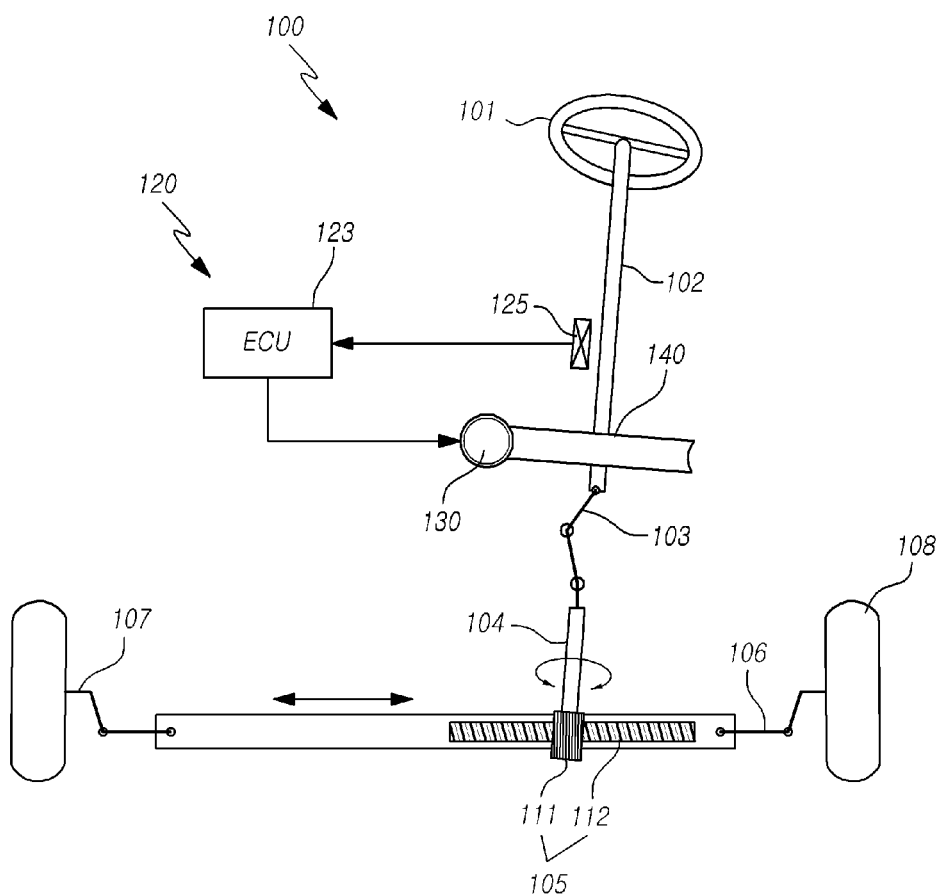
FIG. 1 is a schematic view of a steering shaft driven electric power steering apparatus according to the related art.
Figure 2:
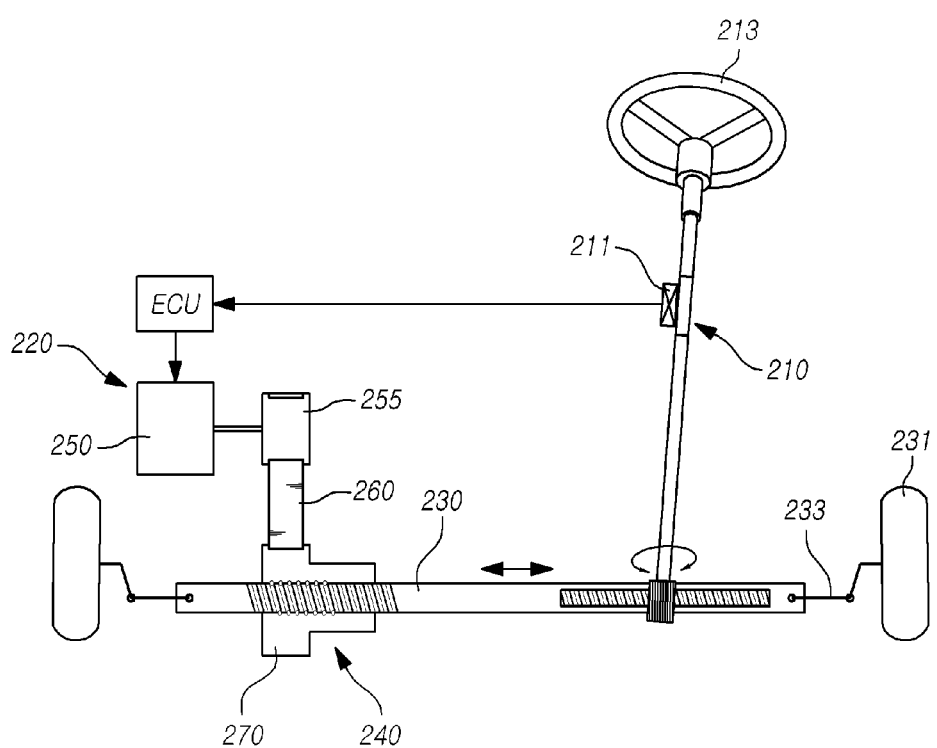
FIG. 2 is a schematic diagram of a rack driven electric power steering apparatus according to the related art.

Hereinafter, exemplary embodiments of the present invention will be described in detail with reference to the accompanying drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
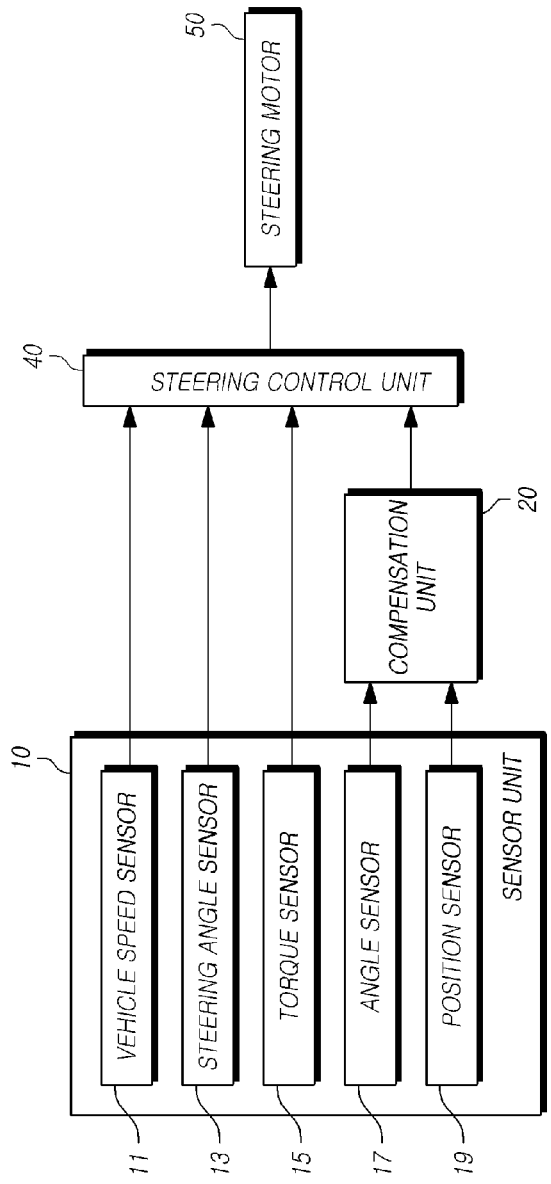
FIG. 3 is a control diagram of an electric power steering apparatus according to the present invention.
Figure 4:
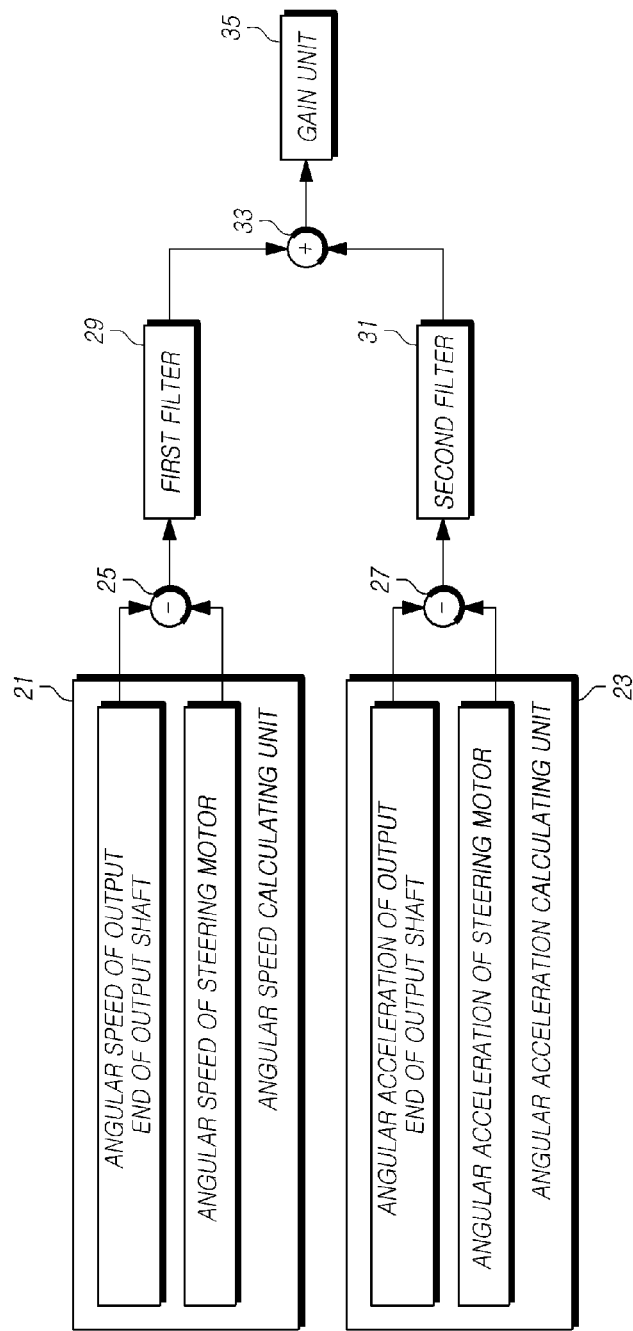
FIG. 4 is a control diagram of a compensation unit of FIG. 1.

FIG. 3 is a control diagram of an electric power steering apparatus according to the present invention, and FIG. 4 is a control diagram of a compensation unit of FIG. 1.

The electric power steering apparatus according to the present invention may compensate for the difference between the rotational speed of a steering motor 50 and the rotational speed of an output end of an output shaft 60 of a steering shaft generated by a mechanical gap.

To achieve this, the electric power steering apparatus may include a steering motor 50 that is operated during a steering operation of a steering wheel, a sensor unit 10 that collects various pieces of information while the vehicle is driven, a compensation unit 20 for compensating for a speed difference that is caused by a mechanical gap, and a steering control unit 40 that controls the steering motor 50 according to a result from the compensation unit 20.

The steering motor 50 is operated to assist a steering force of the steering wheel, and in a rack driven electric power steering apparatus in which a rack bar is driven by the steering motor 50, the steering motor 50 is installed adjacent to the rack bar. In a steering shaft driven electric power steering apparatus in which the steering motor 50 drives the output shaft 60 of the steering column, the steering motor 50 is installed to drive the output shaft 60 of the steering shaft.

The sensor unit 10 detects various pieces of information generated while the vehicle is driven to provide the compensation unit 20 or the steering control unit 40 with the information, and the sensor unit 10 may include a vehicle speed sensor 11, a steering angle sensor 13, a torque sensor 15, an angle sensor 17, and a position sensor 19.

The vehicle speed sensor 11 detects whether the vehicle is driven or stopped, and detects the speed of the vehicle while the vehicle is driven.

The steering angle sensor 13 is a sensor that detects the rotational angle of the steering wheel, and a value detected by the steering angle sensor 13 is provided for the steering control unit 40.

The torque sensor 15 detects a torsion of a torsion bar connected to the output shaft 60 to generate a torque signal while the steering wheel is rotated.

The angle sensor 17 detects a rotational angle of the output end of the output shaft 60, and is mounted on a lower portion of the torsion bar that is connected to the output shaft 60.

In the present invention, the output end of the output shaft 60 refers to a lower area of a torsion bar in a steering shaft or a steering column including an input shaft, an output shaft 60, and the torsion bar arranged between the input shaft and the output shaft.

Figure 5:
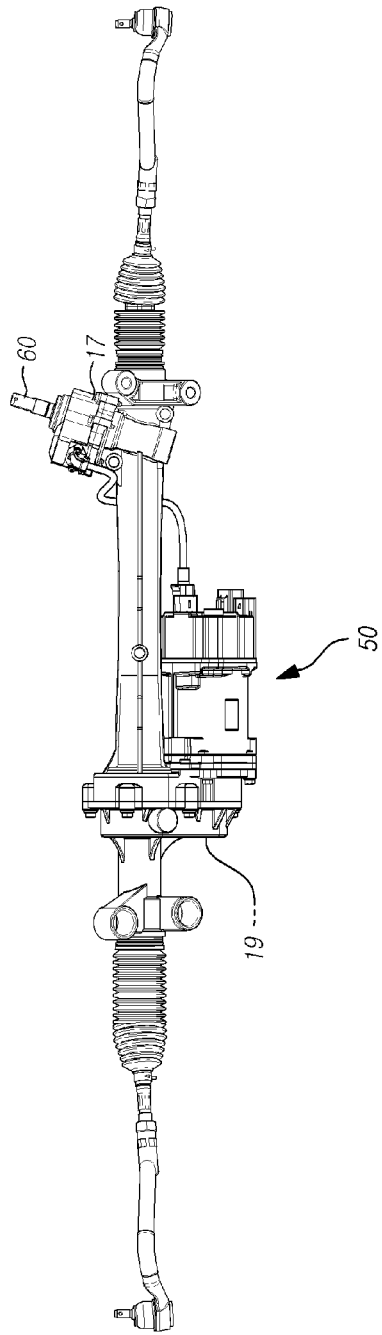
FIG. 5 is a partially perspective view of a rack driven electric power steering apparatus according to the present invention.
Figure 6:
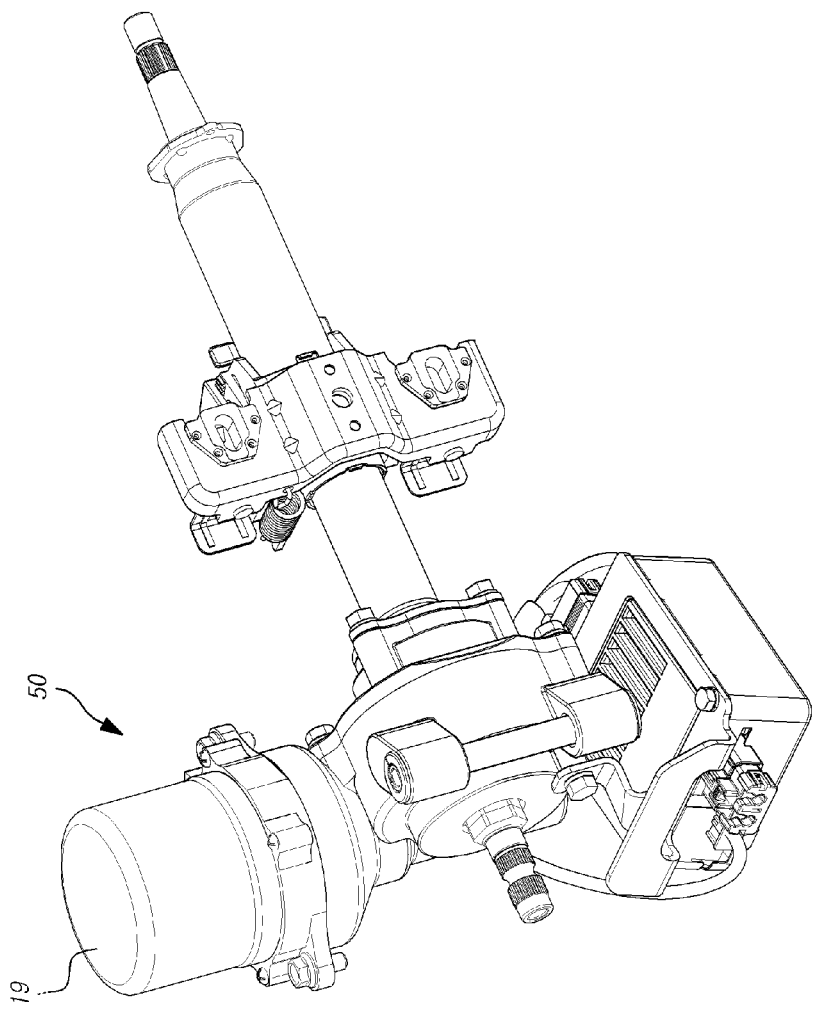
FIG. 6 is a partially perspective view of a steering shaft driven electric power steering apparatus according to the present invention.

Accordingly, as illustrated in FIG. 5, in the rack driven electric power steering apparatus, an end of the output shaft 60 connected to a pinion engaged with the rack bar to be operated is an output end of the output shaft 60, and as illustrated in FIG. 6, in the steering shaft driven electric power steering apparatus, an end of the output shaft 60 that is connected to an output side of the steering motor 50 is an output end of the output shaft 60.

That is, in the specification, the output end of the output shaft refers to a lower area of the steering shaft that is connected to the pinion gear connected to the rack bar through a gear.

The position sensor 19 is installed in the steering motor 50 to detect a rotational angle of the steering motor 50, and generally, the position sensor 19 is mounted on a Blushless DC (BLDC) motor that is used as the steering motor 50.

The compensation unit 20 outputs a difference between the rotational speed of the output end of the output shaft 60 and the rotational speed of the steering motor 50 by using the rotational angle of the output end of the output shaft 60 and the rotational speed of the steering motor 50 detected by the angle sensor 17 and the position sensor 19.

The compensation unit 20 may include an angular speed calculating unit 21, an angular acceleration calculating unit 23, first and second adders 25 and 27, first and second filters 29 and 31, an adder 33, and a gain unit 35.

The angular speed calculating unit 21 calculates the rotational angular speed of the steering motor 50 by using a rotational angle measured by the position sensor 19, and calculates the rotational angular speed of the output end of the output shaft 60 by using a rotational angle measured by the angle sensor 17.

Meanwhile, while the output end of the output shaft 60 is rotated by the steering force of the steering wheel so that the width of the rotational angle thereof is small, the steering motor 50 is relatively rotated more due to the characteristics of the motor so that the rotational speed of the steering motor 50 is adjusted by a reducer. If the ratio (reduction ratio) by which the speed of the steering motor 50 is reduced by a reducer is 18.5 to 1, a lower portion of the output shaft 60 is rotated by one turn while the steering motor 50 is rotated by 18.5 turns. That is, in order to compare the angular speed of the steering motor 50 and the angular speed of the output end of the output shaft 60, a corrected rotational angular speed of the steering motor 50 is calculated by dividing the angular speed of the steering motor 50 by 18.5 and the corrected rotational angular speed of the steering motor 50 should be compared with the angular speed of the output end of the output shaft 60.

If a connection, such as a mechanical connection, between the steering motor and the output shaft of the steering shaft is complete, the rotational angular speed of the steering motor 50 after the reduction ratio is reflected and the rotational angular speed of the output end of the output shaft 60 should be the same.

However, due to an incompleteness of a connection mechanism (a worm wheel, a damper, a belt, a pulley, a ball nut, or the like) between the steering motor and the output end of the output shaft, a difference occurs between the rotational speed of the steering motor after the reduction ratio is reflected and the rotational speed of the output shaft.

Because the rotational speed difference lowers the responsiveness of the steering force, thereby deteriorating the steering feeling, the present invention is directed to overcoming the problem.

Accordingly, the angular speed calculating unit 21 calculates the rotational angular speed of the steering motor that may be compared with the rotational angular speed of the output end of the output shaft 60 by dividing the rotational angle value measured by the position sensor 19 by a reduction ratio. Therefore, because the rotational angular speed of the steering motor 50 calculated and output by the angular speed calculating unit 21 is output after being corrected according to the reduction ratio in advance, it may be compared with the angular speed of the output end of the output shaft 60.

That is, in the specification, the (rotational) angular speed of the steering motor may be defined as a value obtained by dividing a time change rate of the rotational angle measured by the position sensor by the reduction ratio again.

The angular acceleration calculating unit 23 calculates the angular acceleration of the steering motor 50 and the angular acceleration of the output end of the output shaft 60 by differentiating the angular speed of the steering motor 50 calculated by the angular speed calculating unit 21 and the angular speed of the output shaft 60. Then, because the angular acceleration calculated by the angular acceleration calculating unit 23 is obtained by differentiating and calculating the acceleration calculated by the angular speed calculating unit 21, the phase thereof is faster by 90 degrees more than the angular speed thereof. Accordingly, when the difference between the rotational speeds of the steering motor 50 and the output end of the output shaft 60 is compensated for by using an angular acceleration, the compensation can be made more promptly than in the case in which the compensation is made only by using the angular speeds.

The first subtracter 25 calculates a difference between the angular speed of the steering motor 50 and the angular speed of the output end of the output shaft 60. Accordingly, when the angular speed of the steering motor 50 is higher than the angular speed of the output end of the output shaft 60, an output value from the first subtracter 25 becomes a negative value (−). Meanwhile, when the angular speed of the steering motor 50 is lower than the angular speed of the output end of the output shaft 60, an output value from the first subtracter 25 becomes a positive value (+).

The second subtracter 27 calculates the difference between the angular acceleration of the steering motor 50 and the angular acceleration of the output end of the output shaft 60. Accordingly, when the angular acceleration of the steering motor 50 is higher than the angular acceleration of the output end of the output shaft 60, the output vale from the second subtracter 27 becomes a negative value (−), and when the angular acceleration of the steering motor 50 is lower than the angular acceleration of the output end of the output shaft 60, the output value from the second subtracter 27 becomes a positive value (+). Of course, the signs (+ or −) of the output values of the first subtracter and the second subtracter may be defined in an opposite way.

The first filter 29 receives an angular speed difference value that is the difference between the angular speed of the steering motor 50 calculated by the first subtracter 25 and the angular speed of the output end of the output shaft 60, and eliminates noise by filtering the input angular speed difference value.

The second filter 31 receives an angular acceleration difference value that is the difference between the angular acceleration of the steering motor 50 calculated by the second subtracter 27 and the angular acceleration of the output end of the output shaft 60, and eliminates noise by filtering the input angular acceleration difference value.

The first and second filters 29 and 31 employ low pass filters, and obtain an angular speed difference value and an angular acceleration difference value that are reliable, by eliminating noise of not less than a predetermined frequency content from the angular speed difference value and the angular acceleration difference value calculated by the first filter 29 and the second filter 31.

The adder 33 calculates a reference compensation value by adding the angular speed difference values and the angular acceleration difference values that were filtered through the first filter 29 and the second filter 31. The reference compensation value becomes a reference value for compensating for the difference between the rotational speed of the steering motor 50 and the rotational speed of the output end of the output shaft 60.

The gain unit 35 calculates a final compensation value by multiplying the reference compensation value calculated by the adder 33 and a preset gain value together. The gain value is a constant that is determined according to the state and hardware of the vehicle, and is determined according to the model of the vehicle. The final compensation value calculated by the gain unit 35 is provided for the steering control unit 40.

Although it has been described in the above-mentioned embodiment that the compensation unit 20 calculates a compensation value for compensating for the difference between the rotational speed of the steering motor 50 and the rotational speed of the output end of the output shaft 60 by using both the angular speed and the angular acceleration calculated by the angular speed calculating unit 21 and the angular acceleration calculating unit 23, it is apparent that the compensation unit 20 includes only the angular speed calculating unit 21, the first subtracter 25, the first filter 29, and the gain unit 35 and a compensation value for compensating for the difference between the rotational speed of the steering motor 50 and the rotational speed of the output end of the output shaft 60 may be calculated by using only the angular speeds.

When only the angular speed is used in this way, if the angular speed of the steering motor 50 calculated by the angular speed calculating unit 21 and the angular speed of the output end of the output shaft 60 are calculated, the first subtracter 25 calculates the difference between the two angular speeds, the first filter 29 filters the difference between the two values, and the gain unit 35 multiplies the output value from the first filter 29 and the preset gain value together to provide the multiplied result for the steering control unit 40.

The steering control unit 40 may perform a steering assisting function of assisting a steering force while the steering wheel is operated, and a compensation function for compensating for the difference between the rotational speed of the steering motor 50 and the rotational speed of the output end of the output shaft 60.

In order to perform the steering assisting function, the steering control unit 40 receives the detected speed of the vehicle, the steering angle of the steering wheel, and torque information from the vehicle speed sensor 11, the steering angle sensor 13, and the torque sensor 15, and selects a current value that agrees with the speed of the vehicle, the steering angle, and the torque, according to a predesigned algorithm. Accordingly, electric power having the corresponding current value is provided for the steering motor 50, and the steering motor 50 is rotated at a preset rotational speed.

When the steering assisting function is performed in this way, the rotational speed of the steering motor 50 and the rotational speed of the output end of the output shaft 60 should ideally be the same, but a difference between the rotational speeds occurs due to a mechanical gap.

Figure 7:
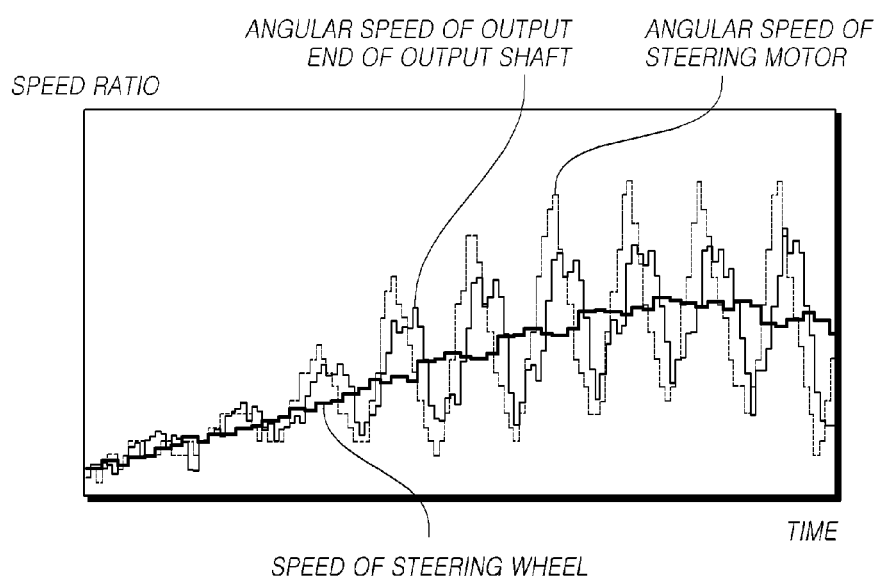
FIG. 7 is a graph obtained by comparing the rotational speeds of a steering motor and an output shaft output end before compensation.

Accordingly, as illustrated in FIG. 7, the phase of the rotational speed of the steering motor 50 is faster than the phase of the rotational speed of the output end of the output shaft 60. Accordingly, in some sections, the rotational speed of the steering motor 50 is higher than the rotational speed of the output end of the output shaft 60, and in some sections, the rotational speed of the steering motor 50 is lower than the rotational speed of the output end of the output shaft 60.

Further, as illustrated in the graph of FIG. 7, the rotational speed of the steering wheel increases relatively linearly, but the rotational speeds of the steering motor 50 and the output end of the output shaft 60 are not constant but are changed vertically with respect to the rotational speed of the steering wheel.

The steering control unit 40 may perform a compensation function to compensate for the phase difference and the rotational speed difference of the steering motor 50 and the output end of the output shaft 60. In order to perform the compensation function, the steering control unit 40 receives the final compensation value calculated by the compensation unit 20.

After receiving the final compensation value, the steering control unit 40 selects a current value for compensating for the corresponding compensation value and provides the current value for the steering motor 50.

That is, if the final compensation value calculated by the compensation unit 20 is a positive value (+), it means that the rotational speed of the steering motor 50 is lower than the rotational speed of the output end of the output shaft 60, and accordingly, the steering control unit 40 performs a control to increase the rotational speed of the steering motor 50 by increasing the current provided for the steering motor 50.

If the final compensation value calculated by the compensation unit 20 is a negative value (−), it means that the rotational speed of the steering motor 50 is higher than the rotational speed of the output end of the output shaft 60, and accordingly, the steering control unit 40 performs a control to decrease the rotational speed of the steering motor 50 by decreasing the current provided for the steering motor 50.

Figure 8:
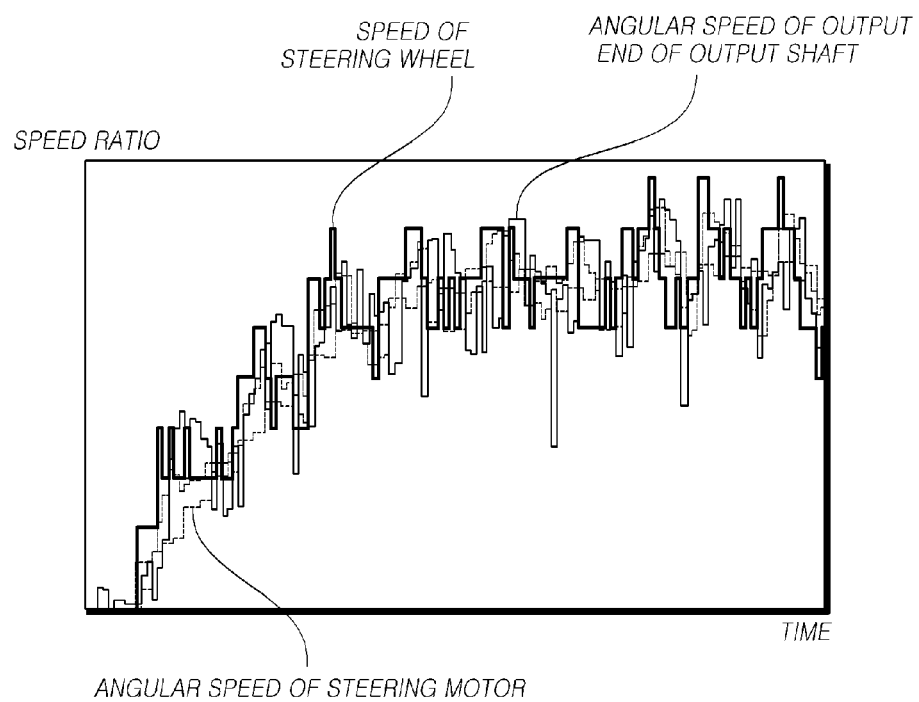
FIG. 8 is a graph obtained by comparing the rotational speeds of a steering motor and an output shaft output end after compensation.

If the steering control unit 40 performs the compensating function in this way, as illustrated in FIG. 8, the speed phase difference of the steering motor 50 and the output end of the output shaft 60 becomes smaller and the change width of the speed of the steering motor 50 becomes smaller so that the steering operation can be stably assisted.

A process of compensating for the difference between the rotational speeds of the steering motor 50 and the output end of the output shaft 60, which occurs due to a mechanical gap in the above-configured electric power steering apparatus, will be described with reference to FIG. 9 as follows.

If the vehicle is started, and the steering wheel is manipulated, the steering control unit 40 performs a steering function of controlling a current applied to the steering motor 50 by determining a current value applied to the steering motor 50 by using information collected from the vehicle speed sensor 11, the steering angle sensor 13, and the torque sensor 15 (S900).

If the steering function is started in this way, the angular speed calculating unit 21 of the compensation unit 20 receives the rotational angle value of the steering motor 50 and the rotational angle value of the output end of the output shaft 60 from the angle sensor 17 and the position sensor 19 and calculates the angular speeds of the steering motor 50 and the output shaft 60, respectively (S910).

Of course, then, the angular speed of the steering motor and the angular speed of the output shaft are defined as values that may reflect the reduction ratio of the reducer to be compared with each other.

Thereafter, the angular acceleration calculating unit 23 differentiates the angular speeds of the steering motor 50 and the output shaft 60, and calculates the angular accelerations of the steering motor 50 and the output shaft 60 (S920).

The angular speeds of the steering motor 50 and the output shaft 60 calculated by the angular speed calculating unit 21 are transmitted to the first sustracter 25, and the angular accelerations of the steering motor 50 and the output shaft 60 calculated by the angular acceleration calculating unit 23 are transmitted to the second subtracter 27. The first subtracter 25 and the second subtracter 27 calculate an angular speed difference value and an angular acceleration difference value, respectively (S930), and the angular speed difference value and the angular acceleration difference value output from the first subtracter 25 and the second subtracter 27 are filtered by the first and second filters 29 and 31 and are input to the adder 33 (S940).

The adder 33 adds the angular speed difference value and the angular acceleration difference value filtered by the first and second filters 29 and 31, and the gain unit 35 calculates a final compensation value by multiplying the added value and a preset gain value together (S950). The final compensation value is transmitted to the steering control unit 40.

If the final compensation value is a positive value (+), the steering control unit 40 increases the current provided for the steering motor 50 to increase the rotational speed of the steering motor 50 by using the final compensation value. Meanwhile, if the final compensation value is a negative value (−), the steering control unit 40 decreases the current provided for the steering motor 50 to decrease the rotational speed of the steering motor 50 (S960).

In this way, according to the present invention, the angular speeds and the angular accelerations of the steering motor 50 and the output end of the output shaft 60 are calculated by measuring the rotational angle of the steering motor 50 and the rotational angle of the output end of the output shaft 60 and then using the rotational angles. Thereafter, the angular speed difference and the angular acceleration difference of the steering motor 50 and the output end of the output shaft 60 are calculated, and the differences are compensated for by adjusting the current value applied to the steering motor 50. Accordingly, responsiveness and stability can be improved while the steering wheel is steered, by decreasing the rotational speed difference of the steering motor 50 and the output end of the output shaft 60 that occurs due to a mechanical gap of the steering motor 50.

Although the embodiments of the present invention have been described for illustrative purposes, those skilled in the art will appreciate that various modifications, additions and substitutions are possible, without departing from the scope and spirit of the invention. Therefore, exemplary aspects of the present disclosure have not been described for limiting purposes. The scope of the present invention shall be construed on the basis of the accompanying claims in such a manner that all of the technical ideas included within the scope equivalent to the claims belong to the present invention.

What is claimed is:

1. An electric power steering apparatus comprising:
   a steering motor that assists a steering force of a steering wheel;
   a position sensor that measures a rotational angle of the steering motor;
   an angle sensor that is mounted on a lower portion of a torsion bar that is connected to a output shaft and measures a rotational angle of an output end of an output shaft connected to the steering wheel; and
   a controller configured to:
      calculate an angular acceleration difference value that is the difference value between an angular acceleration of the steering motor and an angular acceleration of the output end of the output shaft connected to a pinion engaged with a rack bar, by using the rotational angle of the steering motor measured by the position sensor and the rotational angle of the output end of the output shaft; and
      control a current input to the steering motor to compensate for a rotational phase difference of the steering motor and the output end of the output shaft, based on the calculated angular acceleration difference value.

2. The electric power steering apparatus according to claim 1, wherein the controller is further configured to:
   Calculate an angular speed of the steering motor and an angular speed of the output end of the output shaft from the rotational angle of the steering motor and the rotational angle of the output end of the output shaft,
   calculate an angular speed difference value that is the difference of the angular speeds, calculate the angular acceleration of the steering motor and the angular acceleration of the output end of the output shaft by differentiating the angular speed of the steering motor and the angular speed of the output end of the output shaft, calculate the angular acceleration difference value that is the difference of the angular accelerations, and control the current input to the steering motor based on a value obtained by adding the angular speed difference value and the angular acceleration difference value.

3. The electric power steering apparatus according to claim 2, wherein the controller is further configured to:

calculate the angular speed of the steering motor by using the rotational angle measured by the position sensor, and calculate the angular speed of the output end of the output shaft by using the rotational angle value measured by the angle sensor;

calculate the angular speed difference value between the angular speed of the steering motor and the angular speed of the output end of the output shaft;

filter the angular speed difference value;

calculate the angular acceleration of the steering motor and the angular acceleration of the output end of the output shaft by differentiating the calculated angular speed of the steering motor and the calculated angular speed of the output shaft;

calculate the angular acceleration difference value between the angular acceleration of the steering motor and the angular acceleration of the output end of the output shaft;

filter the angular acceleration difference value;

calculate a reference compensation value for compensating for the rotational phase difference between the steering motor and the output end of the output shaft by adding the filtered angular speed difference value and the filtered angular acceleration difference value; and calculate a final compensation value by multiplying the reference compensation value and a preset gain together to provide the calculated final compensation value for controlling the current input to the steering motor.

4. The electric power steering apparatus according to claim 3, wherein the filtering of the angular phase difference value and the filtering of the angular acceleration difference value comprise low pass filtering of the angular phase difference value and the angular acceleration difference value.

5. The electric power steering apparatus according to claim 1, wherein if the rotational speed of the steering motor is lower than the rotational speed of the output end of the output shaft, the controller increases a current provided for the steering motor.

6. The electric power steering apparatus according to claim 1, wherein if the rotational speed of the steering motor is higher than the rotational speed of the output end of the output shaft, the controller decreases a current provided for the steering motor.

7. A method of controlling an electric power steering apparatus, the method comprising:

measuring the rotational angle of a steering motor that assists the steering force of the steering wheel;

measuring the rotational angle of an output end of an output shaft that is connected to the steering wheel to be rotated by using an angle sensor that is mounted on a lower portion of a torsion bar that is connected to the output shaft;

calculating an angular acceleration difference value that is the difference value between an angular acceleration of the steering motor and an angular acceleration of the output end of the output shaft connected to a pinion engaged with a rack bar, by using the rotational angle of the steering motor and the rotational angle of the output end of the output shaft; and controlling a current input to the steering motor to compensate for the rotational phase difference of the steering motor and the output end of the output shaft, based on the calculated angular acceleration difference value.

8. The method according to claim 7, wherein in the calculating of the angular acceleration difference, the angular acceleration of the steering motor and the angular acceleration of the output end of the output shaft are calculated by differentiating an angular speed of the steering motor and an angular speed of the output shaft, wherein the method further comprises:

calculating an angular speed difference value that is a difference between the angular speed of the steering motor and the angular speed of the output end of the output shaft, and calculating a reference compensation value for compensating for the rotation phase difference between the steering motor and the output end of the output shaft by adding the angular speed difference value and the angular acceleration difference value.

9. The method of claim 8, wherein n the calculating of the angular speed difference and the angular acceleration difference further comprises:

filtering the angular speed difference value and the angular acceleration difference value; and calculating a final compensation value by multiplying the compensation value calculated by adding the angular speed difference value and the angular acceleration difference value that were filtered and a preset gain value together, and providing the calculated final compensation value for the controlling of a current.

10. The method according to claim 7, wherein the controlling of a current comprises:

if the rotational speed of the steering motor is higher than the rotational speed of the output end of the output shaft, decreasing a current provided for the steering motor.

11. The method according to claim 7, wherein the controlling of a current comprises:

if the rotational speed of the steering motor is lower than the rotational speed of the output end of the output shaft, increasing a current provided for the steering motor.

12. An electric power steering apparatus comprising:

a steering motor that assists a steering force of a steering wheel;

a position sensor that measures a rotational angle of the steering motor;

an angle sensor that measures a rotational angle of an output end of an output shaft connected to the steering wheel; and a controller configured to:

calculate an angular acceleration difference value that is the difference value between an angular acceleration of the steering motor and an angular acceleration of the output end of the output shaft, by using the rotational angle of the steering motor measured by the position sensor and the rotational angle of the output end of the output shaft; and control a current input to the steering motor to compensate for a rotational phase difference of the steering motor and the output end of the output shaft, based on the calculated angular acceleration difference value.

13. The electric power steering apparatus according to claim 12, wherein the controller is further configured to:
calculate an angular speed of the steering motor and an angular speed of the output end of the output shaft from the rotational angle of the steering motor and the rotational angle of the output end of the output shaft,
calculate an angular speed difference value that is the difference of the angular speeds,
calculate the angular acceleration of the steering motor and the angular acceleration of the output end of the output shaft by differentiating the angular speed of the steering motor and the angular speed of the output end of the output shaft,
calculate the angular acceleration difference value that is the difference of the angular accelerations, and
control the current input to the steering motor based on a value obtained by adding the angular speed difference value and the angular acceleration difference value.

14. The electric power steering apparatus according to claim 13, wherein the controller is further configured to:
calculate the angular speed of the steering motor by using the rotational angle measured by the position sensor, and calculate the angular speed of the output end of the output shaft by using the rotational angle value measured by the angle sensor;
calculate the angular speed difference value between the angular speed of the steering motor and the angular speed of the output end of the output shaft;
filter the angular speed difference value;
calculate the angular acceleration of the steering motor and the angular acceleration of the output end of the output shaft by differentiating the calculated angular speed of the steering motor and the calculated angular speed of the output shaft;
calculate the angular acceleration difference value between the angular acceleration of the steering motor and the angular acceleration of the output end of the output shaft;
filter the angular acceleration difference value;
calculate a reference compensation value for compensating for the rotational phase difference between the steering motor and the output end of the output shaft by adding the filtered angular speed difference value and the filtered angular acceleration difference value; and
calculate a final compensation value by multiplying the reference compensation value and a preset gain together to provide the calculated final compensation value for controlling the current input to the steering motor.

15. The electric power steering apparatus according to claim 14, wherein the filtering of the angular speed difference value and the filtering of the angular acceleration difference value comprise low pass filtering of the angular speed difference value and the angular acceleration difference value.

16. The electric power steering apparatus according to claim 12, wherein if the rotational speed of the steering motor is lower than the rotational speed of the output end of the output shaft, the controller increases a current provided for the steering motor.

17. The electric power steering apparatus according to claim 12, wherein if the rotational speed of the steering motor is higher than the rotational speed of the output end of the output shaft, the controller decreases a current provided for the steering motor.

* * * * *